United States Patent Office 3,197,702
Patented July 27, 1965

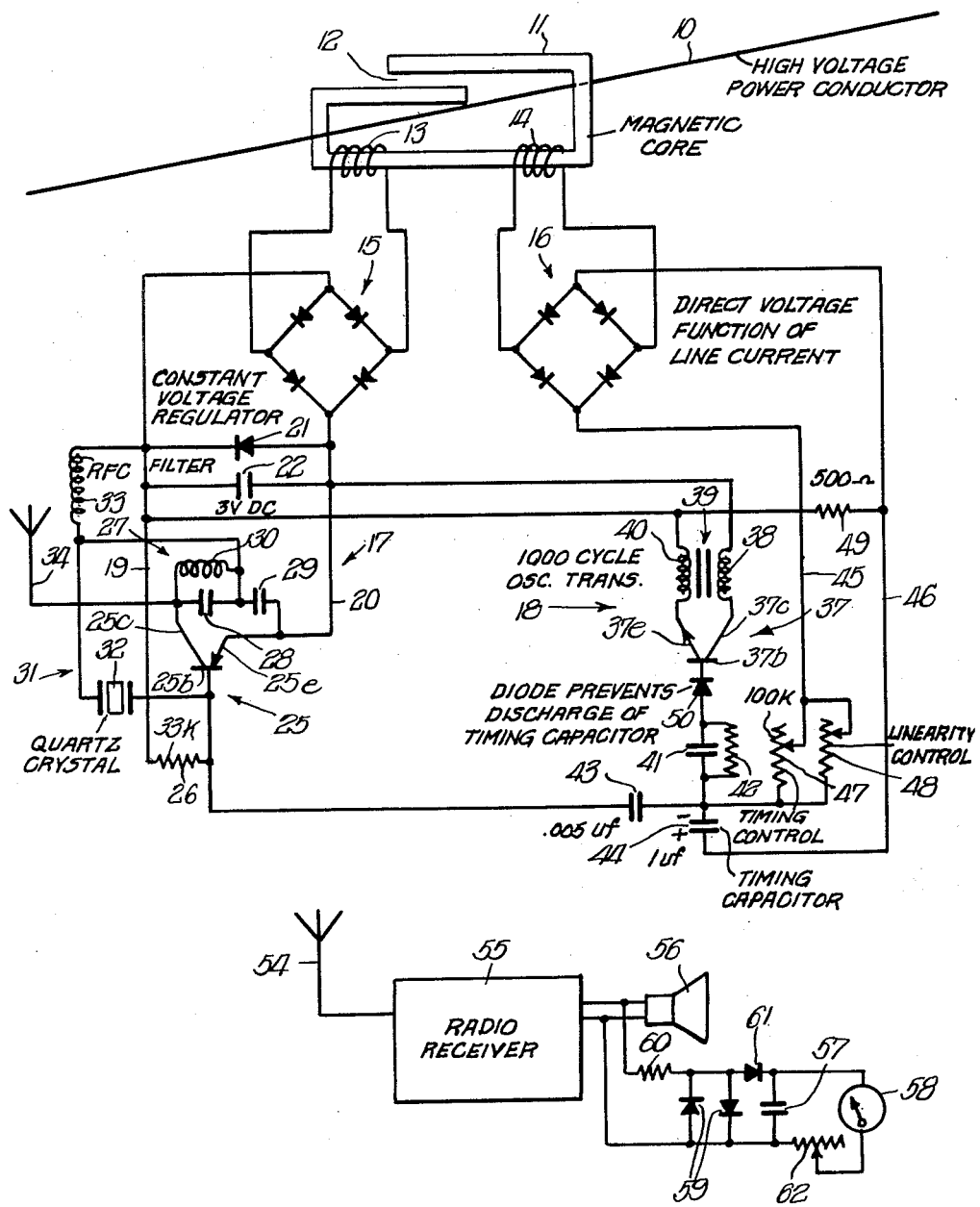

3,197,702
POWER LINE VOLTAGE MEASUREMENT MODULATED TRANSMISSION SYSTEM
Edmund O. Schweitzer, Jr., Northbrook, Ill., assignor, by direct and mesne assignments, to S. & C. Electric Company, Chicago, Ill., a corporation of Delaware
Filed Feb. 19, 1960, Ser. No. 9,992
14 Claims. (Cl. 324—127)

This invention relates, generally, to electric measuring systems and it has particular relation to the measurement of alternating current flowing in a high voltage transmission line conductor and transmitting an indication thereof to a remote point. The present invention is an improvement over the invention disclosed in my Patent No. 2,724,821, issued November 22, 1955.

Among the objects of this invention are: To modulate the transmitting frequency of a radio transmitter with the frequency of an oscillator as a function of the current flow in a conductor; to energize the transmitter and oscillator from the current flow in the conductor; to cause the oscillator to generate the modulation frequency as a series of impulses with the number varying as a function of the magnitude of the current flow in the conductor; to employ a transistorized transmitter and oscillator; to stop the operation of the oscillator by causing it to charge a blocking capacitor that is discharged at a rate which is a function of the magnitude of the current flow in the conductor; to provide a direct voltage which is proportional to the current flow in the conductor for discharging the blocking capacitor; and to vary the time required to discharge the blocking capacitor for a given value of the direct voltage.

Other objects of this invention will, in part, be obvious and in part appear hereinafter.

This invention is disclosed in the embodiment thereof shown in the accompanying drawing and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawing, in which the single figure illustrates diagrammatically a preferred embodiment of this invention.

As shown in the drawing, a conductor 10 is provided which may be a high voltage power conductor forming a part of a high voltage transmission line operating at a voltage of the order of 69 kv., 115 kv. or higher. It will be understood that the conductor 10 can be operated at a lower voltage. However, the present invention is peculiarly adapted for use with a high voltage conductor where use is made of the insulation provided between it and ground over the insulators to insulate the current measuring apparatus. Since the measurement is transmitted by radio from apparatus energized at the voltage of the conductor 10, no problem of insulation arises with respect to the receiving apparatus which can be located at a distance away from the conductor 10 which is greater than the distance between it and the ground.

Surrounding the conductor 10 is a magnetic core 11 which has an air gap 12 therein to permit ready application of the magnetic core 11 to the conductor 10. It will be understood that many forms of magnetic core construction can be used and that the one shown is merely for illustrative purposes. Preferably the construction of the magnetic core 11 is such that it can be suspended on the conductor 10 so that it can, in turn, support the apparatus to be described which operates at the voltage level of the conductor 10 and in response to the current flow therethrough.

It will be understood that the conductor 10 constitutes a single turn primary winding for a current transformer having the magnetic core 11. Positioned on the magnetic core 11 are secondary windings 13 and 14. For example, the secondary winding 13 may comprise 6,000 turns of No. 38 wire while the secondary winding 14 may comprise 2,000 turns of No. 38 wire. These characteristics are set forth for illustrative purposes and as an indication of what has been found to be satisfactory. The secondary windings 13 and 14 are arranged to energize, respectively, bridge type rectifiers 15 and 16.

Preferably the two secondary windings 13 and 14 are employed since they are intended to perform functions which are better accomplished by using separate windings. The secondary winding 13, as stated, energizes the bridge type rectifier 15 and it, in turn, is arranged to energize a transmission oscillator, shown generally at 17, and a modulation oscillator, shown generally at 18. The output of the bridge type rectifier 15 is applied between a negative conductor 19 and a positive conductor 20 so that a voltage of three volts, direct current, appears therebetween when a current of ten amperes or more flows through the conductor 10. A constant voltage regulator 21 in the form of a rectifier is connected between the conductors 19 and 20 and a filter in the form of a capacitor 22 also is connected therebetween in order to reduce the ripple appearing in the direct voltage between the conductors 19 and 20. It will be understood that the arrangement is such that, on a flow of ten amperes or more in the conductor 10 a predetermined voltage, for example, three volts, is maintained between the conductors 19 and 20 regardless of the further increase in current in the conductor 10.

The transmission oscillator 17 includes a transistor, shown generally at 25, which is commercially available and is identified as type 2N248. It has a collector 25c, an emitter 25e, and a base 25b arranged in the manner indicated. A base bias resistor 26 is connected between the base 25b and the negative conductor 19. A transmission circuit, shown generally at 27, is connected between the collector 25c and the emitter 25e. It includes series connected capacitors 28 and 29 and a radio frequency coil 30 which, as shown, is connected between the collector 25c and the common connection between the capacitors 28 and 29. A frequency control circuit, shown generally at 31, is provided for the transmission oscillator 17. It is connected between the common connection between the capacitors 28 and 29 and the base 25b and it includes a quartz crystal 32 which is arranged to operate at a relatively high frequency, for example at a frequency of 27.255 megacycles. It will be understood that the transmission oscillator 17 operates at this frequency to transmit a carrier frequency which can be modulated by the modulation oscillator 18 in a manner to be described. A high impedance radio frequency choke coil 33 interconnects the frequency control circuit 31 and the negative conductor 19. An antenna 34 is connected to the collector 25c and to the radio frequency coil 30 of the transmission circuit 27 for the purpose of radiating the transmitted frequency.

The modulation oscillator 18 includes a transistor that is indicated, generally, at 37 and is of type 2N35. It has an emitter 37e, a collector 37c, and a base 37b connected as shown. The collector 37c is connected through a winding 38 of an oscillation transformer 39 to the positive conductor 20 to provide for feedback to sustain the oscillations of the modulation oscillator 18 which may be arranged to generate an audible frequency of the order of 1,000 cycles per second for modulating the transmission frequency of the transmission oscillator 17. The oscillation transformer 39 includes a winding 40 which is connected between the emitter 37e and the negative conductor 19. Connected to the base 37b is a base bias circuit which includes a capacitor 41 and a parallel connected resistor 42. They are connected through a coupling capacitor 43 to the base 25b of transistor 25 and thereby to the transmission oscillator 17 for modulating it with the frequency of the modulation oscillator 18.

It is desirable that provision be made for operating the modulation oscillator 18 so that its frequency will be applied to the transmission oscillator 17 as a series of impulses with the number of impulses corresponding to the magnitude of the current flow through the conductor 10 or the time between pulses being inversely proportional to the current flow in the conductor 10. For this purpose a timing or blocking capacitor 44 is connected through the base bias circuit to the base 37b. The timing or blocking capacitor 44 is connected between a positive conductor 45 and a negative conductor 46 which are energized from the bridge type rectifier 16 with a direct voltage which is a function of the current flowing through the conductor 10. Interposed in this circuit is a timing control rheostat 47 which is used to vary the calibration of the circuit for discharging the timing or blocking capacitor 44. A linearity control rheostat 48 also is provided in this circuit in order to provide a compensation for the non-linearity of the operating characteristics of the bridge type rectifier 16. Preferably the rheostats 47 and 48 are adjusted in order to provide a number of pulses which can readily be counted and compared with a timing device, such as a stop watch. Also the adjustment is made in order to have a linear relationship between the number of pulses per unit of time and the magnitude of the current flow through the conductor 10.

In order to complete the circuit through the winding 40 of the oscillation transformer 39 and the base 37b, the winding 40 is connected through a resistor 49 to the negative conductor 46 and thence through the timing or blocking capacitor 44 and associated circuitry to the base 37b.

With a view to preventing discharge of the timing or blocking capacitor 44 through the transistor 37 a rectifier 50 is interposed therebetween. Preferably the rectifier 50 is a silicon diode. It is used because the current leakage from the timing or blocking capacitor 44 through the transistor 37 is temperature dependent and varies from one transistor to the other. A silicon diode is used since it has a very high back resistance and a low temperature coefficient. If the transistor 37 were of the silicon type rather than the germanium type, it would be unnecessary to use the rectifier 50. However, silicon transistors require higher voltage for operation and are much more expensive.

Any suitable means can be employed for receiving the modulated carrier frequency from the transmission oscillator 17. For example, an antenna 54 can be placed within the range of the transmission oscillator 17 for connection to a radio receiver 55 which can be tuned to the frequency, i.e., 27.255 megacycles, of the transmission oscillator 17. A loud speaker 56 or ear phones can be connected to the radio receiver 55 so as to provide an audible signal which corresponds to the impulses generated by the modulation oscillator 18 under the control of the timing or blocking capacitor 44 which, in turn, is controlled by the voltage output of the bridge type rectifier 16 that varies directly as the current flow through the conductor 10.

In operation, it will be assumed that the current flow in the conductor 10 is above ten amperes which is a reasonable assumption since transmission lines ordinarily are loaded continuously and at much greater current values than this. With such a current flow the energizing voltage is maintained between the conductors 19 and 20 to cause the transmission oscillator 17 and the modulation oscillator 18 to be energized. The modulation frequency of the order of 1,000 cycles per second is applied to the transmission oscillator 17 and the modulated carrier frequency is transmitted to the radio receiver 55 where the modulation frequency is made audible by the loud speaker 56.

The operating characteristics of the modulation oscillator 18 are such that a much higher voltage is required to start it to oscillate than is required to keep it oscillating. Also, because of the relatively high resistance in the discharge circuit for the timing or blocking capacitor 44, it takes much longer to discharge this capacitor than it does to charge it. Accordingly, the length of the impulses generated by the modulation oscillator 18 is relatively short while the time therebetween is relatively long. The rate at which the timing or blocking capacitor 44 is discharged depends upon the direct voltage between the conductors 45 and 46.

As pointed out, the pulse rate for the modulation oscillator 18 is controlled by the blocking action of the timing or blocking capacitor 44. It builds up a charge during the oscillation of the transistor 37. When it is fully charged, for a given voltage, the oscillations cease. The timing or blocking capacitor 44 is then discharged by means of the direct voltage from the bridge type rectifier 16 which is proportional to the current flow through the conductor 10. Accordingly, the rate of discharge of the timing or blocking capacitor 44 is proportional to the current flow through the conductor 10. This discharge takes place through the timing control rheostat 47 which is used for calibration. When the timing or blocking capacitor 44 is discharged, the oscillations of the transistor 37 resume and the cycle is repeated. As pointed out, the number of pulses in a given time is proportional to the current. In one embodiment of the invention the timing control rheostat 47 was set so that there is one pulse of the modulation frequency for each multiple of five amperes current flow in the conductor 10. Thus, for a current flow of fifteen amperes in the conductor 10, there are three pulses in five seconds. For twenty amperes of current flow in the conductor 10 there are four pulses in five seconds; for fifty amperes there are ten pulses, etc. Alternatively the time between pulses can be measured. If this is done the current flow in the conductor 10 is inversely proportional to time.

It will be understood that the impulses as they are reproduced by the loud speaker 56 can be counted using a stop watch in order to obtain an indication of the current flow in the conductor 10. For example, the radio receiver 55 may form a part of the equipment in a lineman's truck. When the apparatus is moved within the transmitting range of the transmission oscillator 17, the radio receiver 55 can be placed in operation and the pulses received and counted in the manner described.

A continuous indication of the current flow through the conductor 10 can be provided for arranging suitable measuring apparatus which is responsive to the impulses applied to the loud speaker 56. For example, a capacitor 57 is connected to the output of the radio receiver 55 to be charged to a voltage corresponding to the pulse rate. An indicating instrument 58 of the D'Arsonval type is connected across the capacitor 57 having a pointer movable relative to a scale calibrated in amperes. Pulses of constant magnitude from the receiver 55 are provided by oppositely connected diodes 59. A series resistor 60 causes a voltage drop to aid in providing a large signal output which is converted into a direct current signal by rectifier diode 61 and applied to charge capacitor 57 across which the indicating instrument 58 is connected through a calibrating resistor 62 which is adjustable as shown.

Since certain further changes can be made in the foregoing construction and different embodiments of the invention can be made without departing from the spirit and scope thereof, it is intended that all matter disclosed herein shall be interpreted as illustrative and not in a limiting sense.

What is claimed as new is:

1. Means for measuring the flow of current in a conductor and transmitting to a remote point a signal varying according to the magnitude of said current flow comprising, in combination, a radio transmitter operating at a predetermined high frequency and energized by current flow through said conductor, a low frequency generator energized by current flow through said conductor to generate a predetermined low frequency for modulating said high frequency, and means controlled by current flow through said conductor for causing said low frequency generator to generate a series of pulses of said low frequency with the number of pulses of said low frequency per unit time being a function of the magnitude of the current flow in said conductor.

2. Means for measuring the flow of current in a conductor and transmitting to a remote point a signal varying according to the magnitude of said current flow comprising, in combination, a radio transmitter operating at a predetermined high frequency and energized by current flow through said conductor, a low frequency generator energized by current flow through said conductor to generate an audible frequency for modulating said high frequency, and timing means controlled in accordance with the current flow through said conductor for causing said low frequency generator to generate a series of pulses of said audible frequency the number of which per unit time is a function of the magnitude of the current flow in said conductor.

3. Means for measuring the flow of current in a conductor and transmitting to a remote point a signal varying according to the magnitude of said current flow comprising, in combination, a radio transmitter operating at a predetermined high frequency and energized by current flow through said conductor, a low frequency generator energized by current flow through said conductor to generate an audible frequency for modulating said high frequency, and timing means controlled in accordance with the current flow through said conductor for causing said low frequency generator to generate a series of pulses of said audible frequency with the time between pulses being an inverse function of the magnitude of the current flow in said conductor.

4. Means for measuring the flow of current in a conductor and transmitting to a remote point a signal varying according to the magnitude of said current flow comprising, in combination, a radio transmitter operating at a predetermined high frequency and energized by current flow through said conductor, a low frequency generator energized by current flow through said conductor to generate a predetermined low frequency for modulating said high frequency, and means responsive to the magnitude of the current flow through said conductor for periodically causing said low frequency generator to cease functioning with the rate of such cessation being a function of the said magnitude of current flow through said conductor.

5. Means for measuring the flow of current in a conductor and transmitting to a remote point a signal varying according to the magnitude of said current flow comprising, in combination, a radio transmitter operating at a predetermined high frequency and energized by current flow through said conductor, a low frequency generator energized by current flow through said conductor and modulating said high frequency, a capacitor connected to said low frequency generator and when charged thereby to a predetermined extent causing said generator to cease functioning, and means responsive to the current flow in said conductor for discharging said capacitor at a rate dependent upon the magnitude of such current flow to restore said generator to operation, said low frequency generator being characterized by generating an unvarying frequency while said capacitor is being charged whereby said high frequency is modulated with a series of pulses each of the same frequency and the number of which is a function of the magnitude of the current flow through said conductor.

6. Means for measuring the flow of alternating current in a high voltage conductor and transmitting to a remote point a signal varying according to the magnitude of said alternating current comprising, in combination; a transmission oscillator including a transistor having an emitter, a collector and a base, a transmission circuit connected between said emitter and collector, and a frequency control circuit interconnecting the transmission circuit and the base for controlling the transmitting frequency; means for energizing said transmission oscillator from alternating current flow through said conductor to generate said transmission frequency; a modulation oscillator including a transistor having an emitter, a collector and a base, and feedback circuit means connected to the emitter and collector; means for energizing said modulation oscillator from alternating current flow through said conductor to generate a modulating frequency, circuit means coupling said modulation oscillator to said transmission oscillator for modulating said transmission frequency with the modulation frequency, and means responsive to the current flow in said conductor for controlling said modulation oscillator as a function of the magnitude of said current flow to effect a corresponding change in the output of said transmission oscillator.

7. Means for measuring the flow of alternating current in a high voltage conductor and transmitting to a remote point a signal varying according to the magnitude of said alternating current comprising, in combination; a transmission oscillator including a transistor having an emitter, a collector and a base, a transmission circuit connected between said emitter and collector, and a frequency control circuit interconnecting the transmission circuit and the base for controlling the transmitting frequency; means for energizing said transmission oscillator from alternating current flow through said conductor to generate said transmission frequency; a modulation oscillator including a transistor having an emitter, a collector and a base, and feedback circuit means connected to the emitter and collector; means for energizing said modulation oscillator from alternating current flow through said conductor to generate a modulating frequency, circuit means coupling said modulation oscillator to said transmission oscillator for modulating said transmission frequency with the modulation frequency, and means responsive to the current flow in said conductor for controlling said modulation oscillator to cause the modulation frequency to be generated as a series of pulses with the number of pulses per unit of time being a function of the magnitude of the current flowing through said conductor to effect a corresponding change in the output of said transmission oscillator.

8. Means for measuring the flow of alternating current in a high voltage conductor and transmitting to a remote point a signal varying according to the magnitude of said alternating current comprising, in combination; a transmission oscillator including a transistor having an emitter, a collector and a base, a transmission circuit connected between said emitter and collector, and a frequency control circuit interconnecting the transmission circuit and the base for controlling the transmitting frequency; means for energizing said transmission oscillator from alternating current flow through said conductor to generate said transmission frequency; a modulation oscillator including a transistor having an emitter, a collector and a base, and feedback circuit means connected to the emitter and collector; means for energizing said modulation oscillator from alternating current flow through said conductor to generate a modulating frequency, circuit means coupling said modulation oscillator to said transmission oscillator for modulating said transmission frequency with the modulation frequency, a blocking capacitor connected in the circuit to the base of the transistor of said modulation oscillator to be charged thereby and cause its operation to cease, and means for discharging said blocking capacitor including a source of direct voltage derived from and proportional to the current flowing through said conductor for restoring said modulation oscillator to operation within a time depending upon the magnitude of said direct voltage.

9. Means for measuring the flow of alternating current in a high voltage conductor and transmitting to a remote point a signal varying according to the magnitude of said alternating current comprising, in combination; a transmission oscillator including a transistor having an emitter, a collector and a base, a transmission circuit connected between said emitter and collector, and a frequency control circuit interconnecting the transmission circuit and the base for controlling the transmitting frequency; means for energizing said transmission oscillator from alternating current flow through said conductor to generate said transmission frequency; a modulation oscillator including a transistor having an emitter, a collector and a base, and feedback circuit means connected to the emitter and collector; means for energizing said modulation oscillator from alternating current flow through said conductor to generate a modulating frequency, circuit means coupling said modulation oscillator to said transmission oscillator for modulating said transmission frequency with the modulation frequency, a blocking capacitor connected in the circuit to the base of the transistor of said modulation oscillator to be charged thereby and cause its operation to cease, a rectifier interposed between the base of the transistor of said modulation oscillator and said blocking capacitor to prevent discharge of the latter through said modulation oscillator, and means for discharging said blocking capacitor including a source of direct voltage derived from and proportional to the current flowing through said conductor for restoring said modulation oscillator to operation within a time depending upon the magnitude of said direct voltage.

10. Means for measuring the flow of alternating current in a high voltage conductor and transmitting to a remote point a signal varying according to the magnitude of said alternating current comprising, in combination; a transmission oscillator including a transistor having an emitter, a collector and a base, a transmission circuit connected between said emitter and collector, and a frequency control circuit interconnecting the transmission circuit and the base for controlling the transmitting frequency; means for energizing said transmission oscillator from alternating current flow through said conductor to generate said transmission frequency; a modulation oscillator including a transistor having an emitter, a collector and a base, and feedback circuit means connected to the emitter and collector; means for energizing said modulation oscillator from alternating current flow through said conductor to generate a modulating frequency, circuit means coupling said modulation oscillator to said transmission oscillator for modulating said transmission frequency with the modulation frequency, a blocking capacitor connected in the circuit to the base of the transistor of said modulation oscillator to be charged thereby and cause its operation to cease, means for discharging said blocking capacitor including a source of direct voltage derived from and proportional to the current flowing through said conductor for restoring said modulation oscillator to operation within a time depending upon the magnitude of said direct voltage, and adjustable impedance means interposed between said blocking capacitor and said source of direct voltage for varying the time required for a given value of direct voltage to discharge said blocking capacitor.

11. Means for measuring the flow of current in a conductor, transmitting to a remote point a signal varying according to the magnitude of said current flow, and for receiving the signal at the remote point comprising, in combination, a radio transmitter operating at a predetermined high frequency and energized by current flow through said conductor, an audible frequency generator energized by current flow through said conductor to generate a predetermined audible frequency and modulating said high frequency, means responsive to the magnitude of current flow through said conductor causing said audible frequency generator to modulate said high frequency as a series of pulses each of the same audible frequency with the number of pulses per unit of time being a function of the magnitude of the current flowing through said conductor, a radio receiver at the remote point tuned to said high frequency and adapted to reproduce said audible frequency pulses, and means for reproducing audibly said pulses.

12. Means for measuring the flow of current in a conductor, transmitting to a remote point a signal varying according to the magnitude of said current flow, and for receiving the signal at the remote point comprising, in combination, a radio transmitter operating at a predetermined high frequency and energized by current flow through said conductor, a low frequency generator energized by current flow through said conductor to generate a predetermined frequency and modulating said high frequency, means responsive to the magnitude of current flow through said conductor causing said low frequency generator to modulate said high frequency as a series of pulses each of the same frequency with the number of pulses per unit of time being a function of the magnitude of the current flowing through said conductor, a radio receiver at the remote point tuned to said high frequency and adapted to reproduce said low frequency pulses, and means for totalizing said low frequency pulses to provide a quantity corresponding to the flow of current in the conductor.

13. Means for measuring the flow of current in a conductor, transmitting to a remote point a signal varying according to the magnitude of said current flow, and for receiving the signal at the remote point comprising, in combination, a radio transmitter operating at a predetermined high frequency and energized by current flow through said conductor, a low frequency generator energized by current flow through said conductor to generate a predetermined frequency and modulating said high frequency, means responsive to the magnitude of current flow through said conductor causing said low frequency generator to modulate said high frequency as a series of pulses each of the same frequency with the number of pulses per unit of time being a function of the magnitude of the current flowing through said conductor, a radio reeciver at the remote point tuned to said high frequency and adapted to reproduce said low frequency pulses, and means for totalizing said low frequency pulses to provide a quantity corresponding to the flow of current in the conductor comprising a capacitor connected to said radio receiver to be charged to a voltage corresponding to the pulse rate, and measuring means connected to be energized according to the charge on said capacitor.

14. Means for measuring the flow of alternating current in a conductor of a high voltage power transmission line and transmitting to a remote point a signal varying according to the magnitude of said alternating current comprising, in combination, a radio transmitter, means coupling said transmitter to said conductor whereby said transmitter is energized by current flow through said conductor, said transmitter including a transmission oscillator having a frequency control circuit with a crystal therein for generating a transmission frequency of predetermined value, a low frequency generator energized by current flow through said conductor to generate a predetermined low frequency for modulating said transmission frequency, and means controlled by current flow through said conductor for causing said low frequency generator to generate a series of pulses of said low frequency with the number of pulses of said low frequency per unit time being a function of the magnitude of the current flow in said conductor.

References Cited by the Examiner

UNITED STATES PATENTS

| | | | |
|---|---|---|---|
| 2,144,215 | 1/39 | Beverage | 340—207 |
| 2,498,809 | 2/50 | Haner | 331—47 |
| 2,613,347 | 10/52 | Todd | 332—2 |
| 2,724,821 | 11/55 | Schweitzer | 340—201 |
| 2,874,292 | 2/59 | Varley | 331—47 |
| 2,899,648 | 8/59 | Gregory | 332—16 |

WALTER L. CARLSON, *Primary Examiner.*

FREDRICK M. STRADER, ROBERT H. ROSE, GEORGE N. WESTBY, *Examiners.*